US009763062B2

United States Patent
Ibarra

(10) Patent No.: US 9,763,062 B2
(45) Date of Patent: Sep. 12, 2017

(54) RAPID DEPLOYMENT OF SOFTWARE UPDATES IN MULTI-HOP WIRELESS NETWORKS

(71) Applicant: Synapse Wireless, Inc., Huntsville, AL (US)

(72) Inventor: Eric Joseph Ibarra, Madison, AL (US)

(73) Assignee: Synapse Wireless, Inc., Huntsville, AL (US)

( * ) Notice: Subject to any disclaimer, the term of this patent is extended or adjusted under 35 U.S.C. 154(b) by 197 days.

(21) Appl. No.: 14/676,609

(22) Filed: Apr. 1, 2015

(65) Prior Publication Data

US 2016/0295377 A1 Oct. 6, 2016

(51) Int. Cl.
| | | |
|---|---|---|
| H04W 4/06 | (2009.01) | |
| H04W 8/18 | (2009.01) | |
| H04W 8/24 | (2009.01) | |
| H04W 76/00 | (2009.01) | |
| G06F 9/445 | (2006.01) | |
| H04W 28/18 | (2009.01) | |
| H04W 4/00 | (2009.01) | |

(52) U.S. Cl.
CPC ............... *H04W 4/06* (2013.01); *G06F 8/65* (2013.01); *H04W 8/186* (2013.01); *H04W 8/245* (2013.01); *H04W 76/002* (2013.01); H04W 4/001 (2013.01); H04W 28/18 (2013.01)

(58) Field of Classification Search
CPC .......... G06F 8/65; H04W 28/18; H04W 4/06; H04W 76/002; H04W 8/245; H04W 8/186
See application file for complete search history.

(56) References Cited

U.S. PATENT DOCUMENTS

| | | | |
|---|---|---|---|
| 2004/0022221 A1 | 2/2004 | Chwieseni et al. | |
| 2006/0106916 A1 | 5/2006 | Paparella et al. | |
| 2008/0072037 A1* | 3/2008 | Narayanan | ............ H04L 9/3215 713/156 |
| 2008/0279204 A1* | 11/2008 | Pratt, Jr. | ................ G01D 21/00 370/406 |
| 2008/0287058 A1 | 11/2008 | Nahm et al. | |

(Continued)

OTHER PUBLICATIONS

International Search Report and Written Opinion issued Jul. 1, 2016 in corresponding International Application No. PCT/US16/25620 filed on Apr. 1, 2016, 12 pages.

*Primary Examiner* — Robert M Morlan
*Assistant Examiner* — Nourali Mansoury
(74) *Attorney, Agent, or Firm* — Angela Holt; Bradley Arant Boult Cummings LLP

(57) ABSTRACT

In a system and method for upgrading software in a wireless mesh network, a first node in the network sends a first multicast request to a plurality of other nodes in the network that are in radio range of the first node. The first multicast request queries whether the other nodes are running a software version older than the software version and device type currently running in the first node. The first node then selects a node to upgrade and sends a request asking if any other nodes have already claimed that node. The first node then updates the nodes only if they have not been claimed for update by another node. In upgrading the claimed nodes, the first node copies to the claimed nodes the software it is currently executing in its internal flash memory thereby creating a clone, and does not store any additional copies of the updated software.

15 Claims, 4 Drawing Sheets

(56) References Cited

U.S. PATENT DOCUMENTS

| | | |
|---|---|---|
| 2011/0029965 A1 | 2/2011 | Lamba et al. |
| 2012/0102478 A1 | 4/2012 | Jeong |
| 2014/0028468 A1 | 1/2014 | Grady et al. |
| 2014/0089912 A1 | 3/2014 | Wang et al. |
| 2014/0123123 A1 | 5/2014 | Bahls |
| 2015/0154077 A1* | 6/2015 | Marra .................. G06F 11/143 714/15 |

\* cited by examiner

RAPID DEPLOYMENT OF SOFTWARE UPDATES IN MULTI-HOP WIRELESS NETWORKS

BACKGROUND AND SUMMARY

Deploying new software or configuration settings to large or geographically distributed wireless networks can be difficult and time consuming. Upgrades have traditionally been performed by a centralized device that communicates individually to each device (e.g., node) that requires an update. If a network is comprised of multiple hops from this centralized device to the end device requiring an update, communication may be unreliable, thereby causing failures. Additionally, the amount of time required to upgrade one device at a time in a large network could become impractical.

One method of solving this problem is to distribute the node update process so that any node can upgrade any other node. Once this capability is enabled, there is no longer a single point coordinating updates, and updates can begin to occur concurrently. As each additional node is upgraded, it becomes one more node which has the potential to simultaneously upgrade another node. This method can also enable the upgrading of large, low-power networks which spend most of their time in a low-power state, for example, the Sleepy Mesh® network provided by Synapse Wireless, Inc. Because the entire network does not need to be active to maintain communication links between all nodes, upgrades can happen between any two devices, though upgrades between neighboring devices yield best performance.

There are, however, some limitations on the actual number of nodes being simultaneously upgraded. Depending on the RF channel availability, there are a limited number of simultaneous packets that can be transmitted wirelessly. The probability of packet collisions can be reduced by spreading these packet transmissions out in frequency, separating them in time, or spreading them by spread spectrum spreading codes. To find the optimum channel availability for each channel, a limited number of upgrade attempts should occur such that once a unit has failed multiple times due to lack of channel availability, it should stop or temporarily delay attempting to search for nodes to be upgraded. Recognizing that the channel bandwidth has been saturated and ceasing traffic for that channel frees up channel availability so that each RF channel's capacity is maximized.

Once a node has the capability to upgrade other nodes, the process for determining which node it will choose to update can be done a few different ways depending on network configuration. Firstly, the node will transmit a multicast broadcast "search" message asking for an application version and device type if it has one. If the device type matches and the application version is out of date or one is not present, then the responding device is a candidate for an upgrade. In a dense network however, multiple devices will likely respond to the single broadcast "search" message. The originating device must determine which of the eligible devices it will choose to actually perform the upgrade on. One simple method would be to simply choose the first eligible device who responds. For a more robust system, it may be preferable for the device to determine the respondent node with the best signal strength measurement which is measured while receiving each of the responses.

The process of an upgrade according to an exemplary embodiment of the present disclosure starts off with a broadcast "search" message in which the originating node sends a multicast message where only nodes that have a different version than the originator or no application code at all will respond. The responses to the "search" message are randomly distributed over a fixed time interval such that responses have a significantly reduced probability of interfering with each other during wireless transmission. Once all of the devices within radio range have responded to the "search" message, a handshaking process will begin where the initiating node (Node A, e.g.) has to "claim" another node as a designee to be upgraded. if another node (Node B, e.g.) has already "claimed" this node (Node C, e.g.), the claiming node (Node B) will inform the first node (Node A) that it can't upgrade the claimed node (Node C) and must choose a different one. This process eliminates or drastically reduces conflicts where two devices attempt to upgrade the same device at the same time. While such conflicts may not actually cause a problem for the upgrade process, they could reduce the speed of the upgrade process and therefore reduce the efficiency of the upgrade process.

In another embodiment requiring an additional handshaking step, the upgrade performance is enhanced by combining the "claiming" process with a process of moving the designee node to a unique network (either by frequency, time, or spreading code).

The method according to the present disclosure allows mobile, ad-hoc, and even peer-to-peer networks with no central point of communication to perform network upgrades. For example, an upgraded node can be in a device worn by a person, and that device could upgrade any devices that come within range of that person. For example, people passing by wearing devices in need of upgrades could be upgraded automatically when they pass within radio range. For example, this could be done with cell phones: if a user with an upgraded device passes near someone with a device in need of upgrading, the upgraded device can automatically upgrade the passing device.

DETAILED DESCRIPTION

Figure 1:
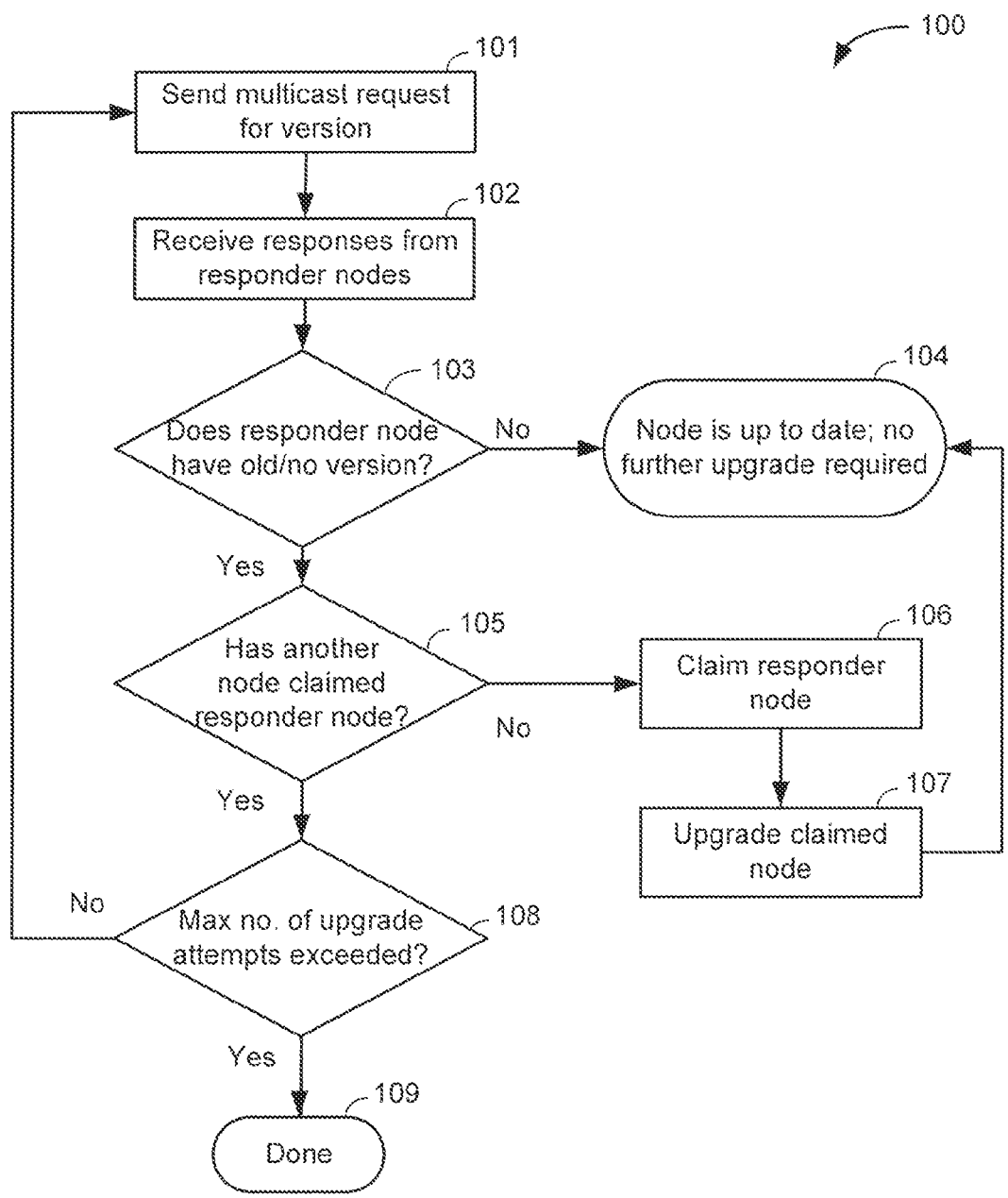
FIG. 1 is a flowchart depicting an exemplary method of upgrading a mesh network, in accordance with an exemplary embodiment of the disclosure.

FIG. 1 depicts an exemplary method 100 for upgrading nodes in a mesh network in accordance with an exemplary embodiment of the disclosure. In step 101 of the method 100, a first node 201 (FIG. 2) that has already received a software upgrade sends a multicast request to other nodes in the network 200 (FIG. 2) asking what version of software the other nodes have.

Figure 2:
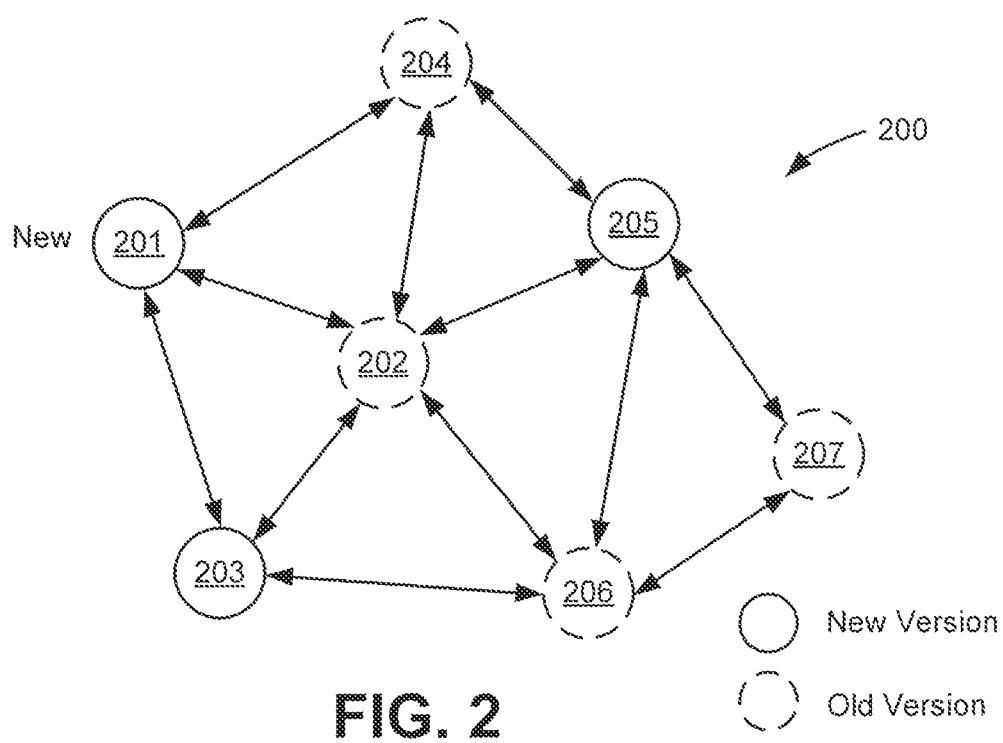
FIG. 2 depicts a plurality of nodes in a mesh network, some nodes containing updated software and some nodes containing older software.

FIG. 2 illustrates a network 200 utilizing the method 100, depicting a plurality of nodes 201-207 in an exemplary mesh network 200, in which nodes 201, 203, and 205 have already been updated, and nodes 202, 204, 206 and 207 have not been updated.

Referring to FIG. 1, in step 102 of the method 100, the node 201 receives responses from nodes within its radio range. For example, with reference to FIG. 2, node 203 may respond to the first node 201 that the node 203 has the same version of software as the first node 201. To reduce RF traffic and the potential for packet collisions, the nodes are configured in such a manner that only devices which have not been upgraded yet respond to the "search" broadcast from the first node 201 in step 101 of the method 100.

In step 103 of the method 100, if a responder node has the same version as the first node 201, the responder node (203, for example) is up to date and requires no further upgrade. Once all of the nodes within radio range have responded to the first node 201, a handshaking process begins where the first node 201 has to "claim" a responding node as a designee in order for that responding node to be upgraded. Thus if a responder node (for example, node 202 in FIG. 2) has an older version of software, or no version of software as in the ease with a new device recently added to the network 200), then in step 105 of the method 100, the first node 201 inquires to the responder node 202 if node 202 has already been claimed by another node, for upgrading purposes.

If another node has already claimed the responder, the other node will inform the requesting node (201) that the requesting node cannot upgrade that node. In step 106, if the responding node (202, FIG. 2) responds that it has not been claimed by another node for updating, the first node 201 claims the responder node.

Figure 3:
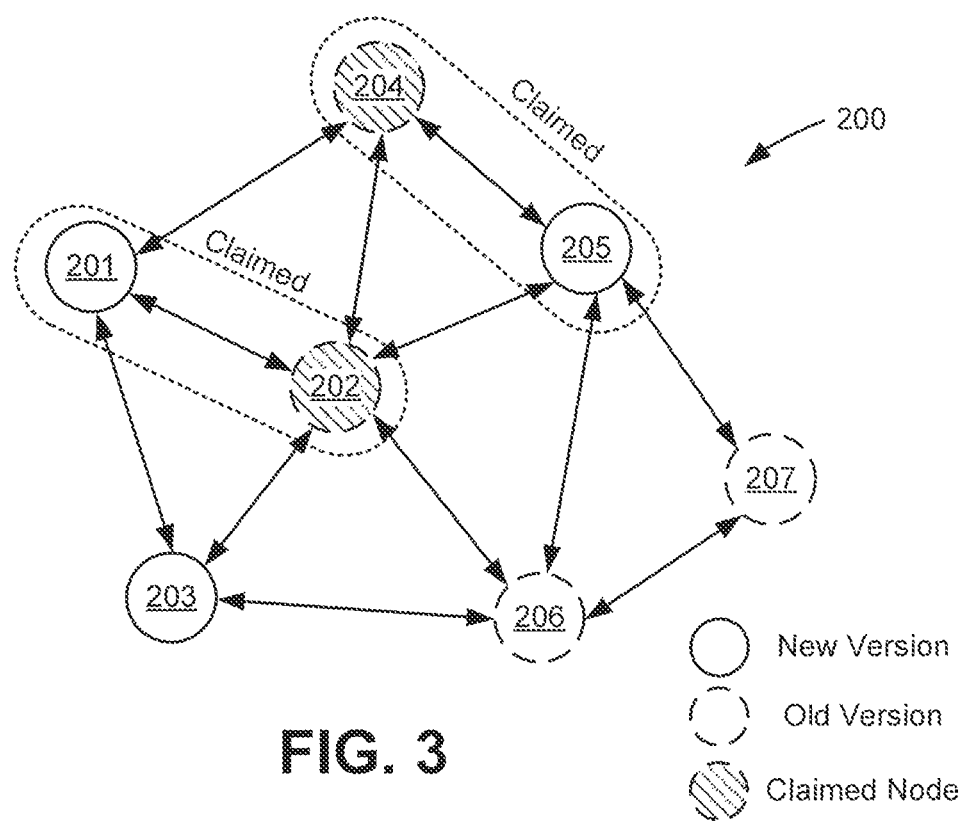
FIG. 3 depicts an exemplary step of the method of FIG. 1, in which the first node has claimed a responder node.

FIG. 3 illustrates an exemplary step 106 in which the first node 201 has claimed responder node 202. FIG. 3 further illustrates an exemplary step 106 in which the node 204 has claimed the node 205. In the exemplary embodiment illustrated in FIG. 3, once node 204 has been claimed by node 205, when node 201 attempts to claim node 204, node 205 informs node 201 that node 204 has already been claimed. More generally, in this embodiment, once a node has been claimed by another node, if a different node later attempts to claim the already-claimed node, the node that has claimed the already-claimed node will inform the different node that the already-claimed node has been claimed, until the upgrade process has completed. In other embodiments, the already-claimed node (e.g., node 204 in FIG. 3) informs the different node that it has already been claimed.

In step 107 of the method 100, the first node 201 upgrades the now-claimed responding node 202. Packets containing the upgraded software are sent unicast from the first node 201 node to the claimed node with no routing in between. The upgrading process is further discussed with respect to FIG. 4 herein.

If a responding node responds that it has already been claimed by another node, then the method 100 proceeds to step 108, in which the first node 201 checks to see if its maximum number of upgrade attempts has been exceeded, before sending another multicast request in step 101 of the method 100. In this regard, a user may set a predetermined number of upgrade cycles or attempts, in order to limit network density. If the max number of upgrade attempts has been exceeded, the first node 201 does not attempt further upgrades. Further, the "maximum number of upgrade attempts" may include upgrade failures due to limited channel bandwidth.

Figure 4:
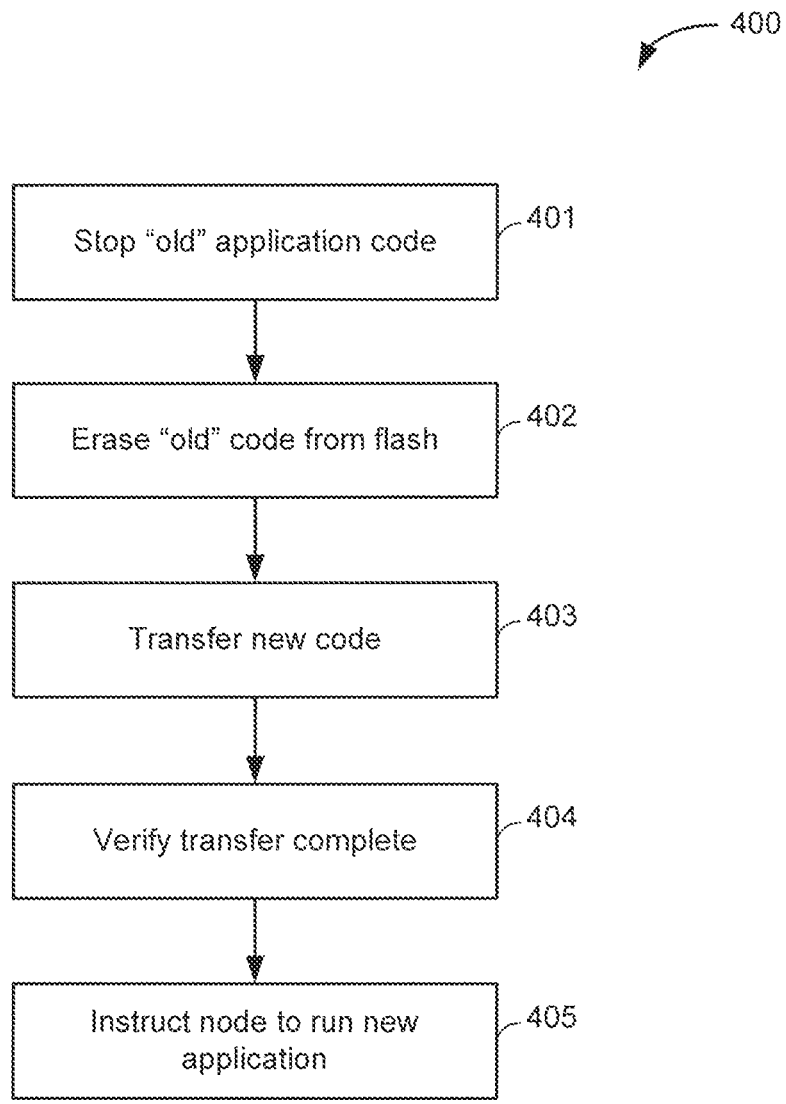
FIG. 4 is a flowchart depicting the step of upgrading a responder mode, according to the method of FIG. 1.

FIG. 4 depicts an exemplary method 400 for performing the software upgrade of a node as shown in step 107 of the method 100 of FIG. 1, in accordance with an exemplary embodiment of the disclosure. In step 401 of the method 400, the upgrading node (node 201 of FIG. 3, for example) stops operation of application code on the node that will be receiving the upgrade, referred to herein as the "claimed" node. Nodes that were recently added to the network may not yet have application code, in which case step 401 is unnecessary.

In step 402 of the method 400, the upgrading node erases the "old" application code (if present) from the claimed node. In step 403 of the method, the upgrading node transfers new code to the claimed node by reading the contents of the upgrading node's flash and transferring the code to the claimed node. Importantly, the upgrading node does not have an external flash containing copy of the "new" code. Rather, the upgrading node copies (essentially, clones) the application code from its internal flash (of executing code) directly to the claimed node. This feature of the present system and method means that external flash hardware is not required to be present on any of the nodes in order to upgrade the nodes. In prior art methods, a node must have another memory device, in addition to the memory housing the executing code.

Once the transfer has been completed, in step 404 the upgrading node verifies the checksum of the data that has been transferred to ensure that it has been successfully transferred without error. In step 405, the upgrading node instructs the claimed node to run the new application, or use the new settings, as applicable.

Figure 5:
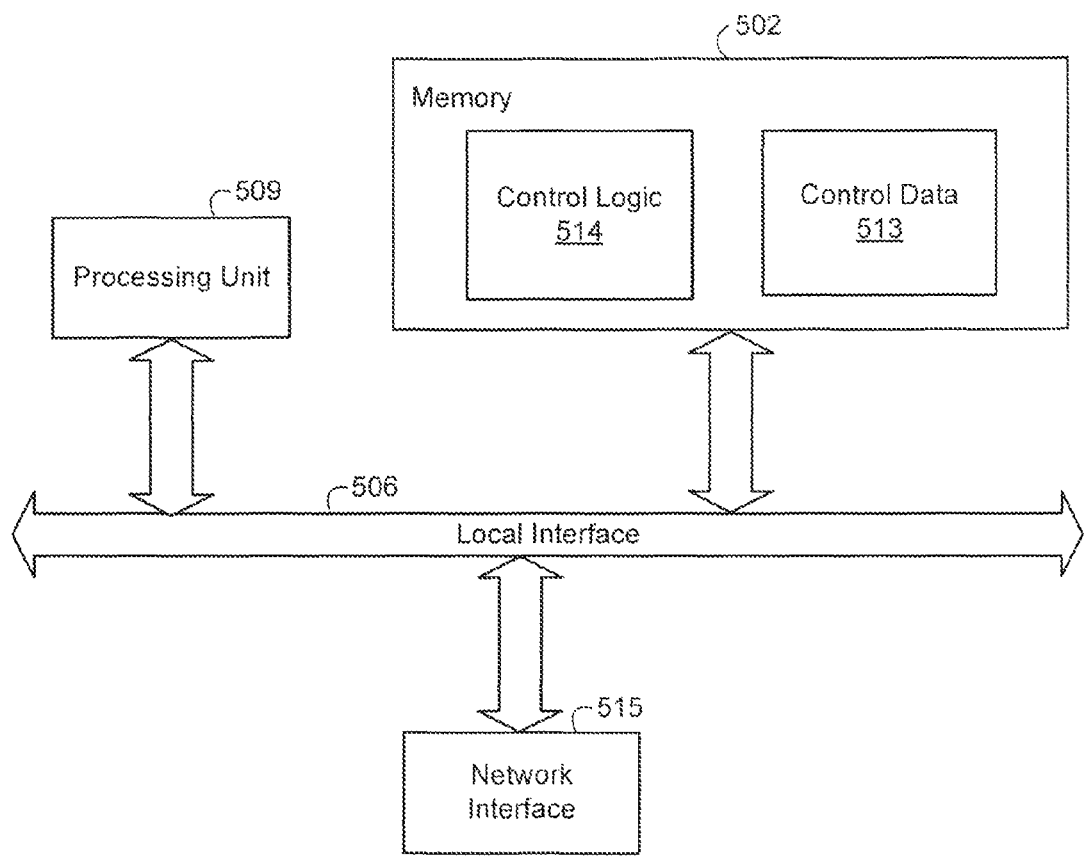
FIG. 5 is a block diagram illustrating a node in accordance with an exemplary embodiment of the present disclosure.

FIG. 5 depicts an exemplary node 201 in accordance with an exemplary embodiment of the present disclosure. The exemplary node 201 generally comprises a processing unit 509 and a network interface 515, all communicating over a local interface 506.

The node 201 further comprises control logic 514 and control data 513. The control logic 514 and control data 513 can be software, hardware, or a combination thereof. In the exemplary node 201, the control logic 514 and control data 513 are shown as software stored in memory 502. The memory 502 may be of any suitable type of computer memory known in the art, such as RAM, EPROM, flash-type, and the like.

As noted herein, the control logic 514 and the control data 513 are shown in FIG. 5 as software stored in memory 502. When stored in memory 502, the control logic 514 and the control data 513 can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

The processing unit 509 may be a digital processor or other type of circuitry configured to run the control logic 514 by processing and executing the instructions of the control logic 514. The processing unit 509 communicates to and drives the other elements within the node 201 via the local interface 506, which can include one or more buses.

The network interface 515 is a device through which the node 201 communicates over a network (not shown). For example, the network interface 515 may be a Global System for Mobile Communications (GSM) cellular radio port or other type network device that connects the node 201 with the network for communication with other nodes. The network interface 515 may comprise any number of communications mediums known in the art, for example a wireless solution such as Ethernet, WiMAX, fiber optic, power line communication (PLC), a LAN radio, a WAN radio, an AMPS radio, or other devices suitable for connection to a network. The network interface 515 may comprise software, hardware, or a combination thereof.

The network interface 515 further enables the control logic 514 to communicate with other nodes (not shown) in the network. In at least one exemplary embodiment, communication is conducted using wireless signals, but communication between the nodes may occur over physical media in other embodiments.

The control logic 514 generally controls the operation of the node 201. The control logic 514 can be implemented in software, firmware, hardware, or any combination thereof. In an exemplary embodiment illustrated in FIG. 5, control logic 514 is implemented in software and stored in memory 502. Network upgrades can be programmed to be performed on start-up, periodically, or on command.

Note that the control logic 514, when implemented in software, can be stored and transported on any computer-readable medium for use by or in connection with an instruction execution apparatus that can fetch and execute instructions. In the context of this document, a "computer-readable medium" can be any means that can contain, store, communicate, propagate, or transport a program for use by or in connection with the instruction execution apparatus.

The system and method described herein are especially applicable in large low-power networks which spend most of their time in a low-power state. In such networks, the nodes switch between an "awake" mode and a "sleep" mode from time-to-time. During the awake mode, the nodes can send, receive, and route communications. During the sleep mode, the nodes cannot send, receive, and route communications, but consume less power than when in the awake mode.

In order to upgrade such a network using previously known methods, all of the nodes would need to be synchronized to wake up at the same time in order to upgrade the entire network, because multiple hops would be required for updates to reach the furthest nodes. Waking up all of the nodes at the same time would require an undesirable amount of battery power. With the currently-disclosed method, any node can upgrade any other node, so only two nodes need to be awake at the same time for a node upgrade to occur. Upgrades can automatically take place in wake-up cycles as the wake-up cycles occur for neighboring nodes.

Further, a gateway device does not have to be present anywhere in the present system. Any node can upgrade any other node at any time. The upgrades are typically done at periodic intervals. Nodes periodically search for any nodes in range requiring an upgrade and automatically perform the upgrade. For example, if a new device is brought within proximity of the network, the new device would automatically be upgraded.

In other embodiments according to the present disclosure network performance is increased by combining the "claiming" process with a process of moving the claimed node to a unique network (either by frequency, time, or code).

This disclosure may be provided in other specific forms and embodiments without departing from the essential characteristics as described herein. The embodiments described are to be considered in all aspects as illustrative only and not restrictive in any manner.

What is claimed is:

1. A system for upgrading software in a wireless mesh network, the system comprising:
   a first node, the first node running software in internal flash memory, the software comprising a first software version;
   a second node in communication with the first node over the network;
   logic configured to cause the first node to send a first query to the second node to obtain status data, the status data comprising data indicating whether the second node comprises the first software version;
   logic configured to copy, from the internal flash memory, the first software version to the second node if the second node does not comprise the first software version; and
   logic further configured to cause the first node to send a second query to determine whether the second node has been previously claimed by another node, the logic further configured to pedal a software update on the second node only if the second node is not currently claimed by another node.

2. The system of claim 1, wherein the first and second queries are multicast messages.

3. The system of claim 2, the logic further configured to cause any node that has already claimed the second node to respond to the first node that the second node has already been claimed.

4. The system of claim 3, wherein the response of a node that has already claimed the second node to the first node is a unicast message.

5. The system of claim 2, the logic further configured to cause the second node to respond to the first node that the second node has already been claimed.

6. The system of claim 5, wherein the response of the second node to the first node is a unicast message.

7. The system of claim 1, wherein the logic is further configured to determine whether the first node has exceeded a maximum allowable number of upgrade attempts.

8. A method for upgrading software in a network, the method comprising:
   sending, from a first node in a wireless mesh network, a first request to a plurality of other nodes in the wireless mesh network, the request querying whether the plurality of other nodes are running a software version different from a software version currently running in the first node;
   sending, to any nodes that respond to the first request in the affirmative, a second request querying whether the responding nodes have already been claimed by a node for software upgrade;
   receiving, from each node that has already claimed a node, data indicating what nodes have already been claimed;
   claiming each node that has not already been claimed; and
   automatically updating the software in each node that has not already been claimed.

9. The method of claim 8, wherein the network comprises a wireless mesh network.

10. The method of claim 8, further comprising inquiring whether the first node has exceeded a maximum allowable number of upgrade attempts.

11. The method of claim 10, further comprising discontinuing upgrade attempts if the first node has exceeded the maximum allowable number of upgrade attempts.

12. The method of claim 8, wherein the step of updating the software in each node that has not already been claimed comprises the steps of:
   stopping execution of code currently executing in the claimed node;
   erasing the code currently executing in the claimed node;
   copying code currently executing in the first node to the claimed node.

13. The method of claim 12, wherein the step of updating the software in each claimed node further comprises verifying the transfer of code is complete.

14. The method of claim 13, wherein the step of updating the software in each claimed node further comprises instructing the claimed node to run the newly-installed code.

15. The method of claim 8, wherein the first and second requests are multicast messages.

* * * * *